Patented Aug. 18, 1936

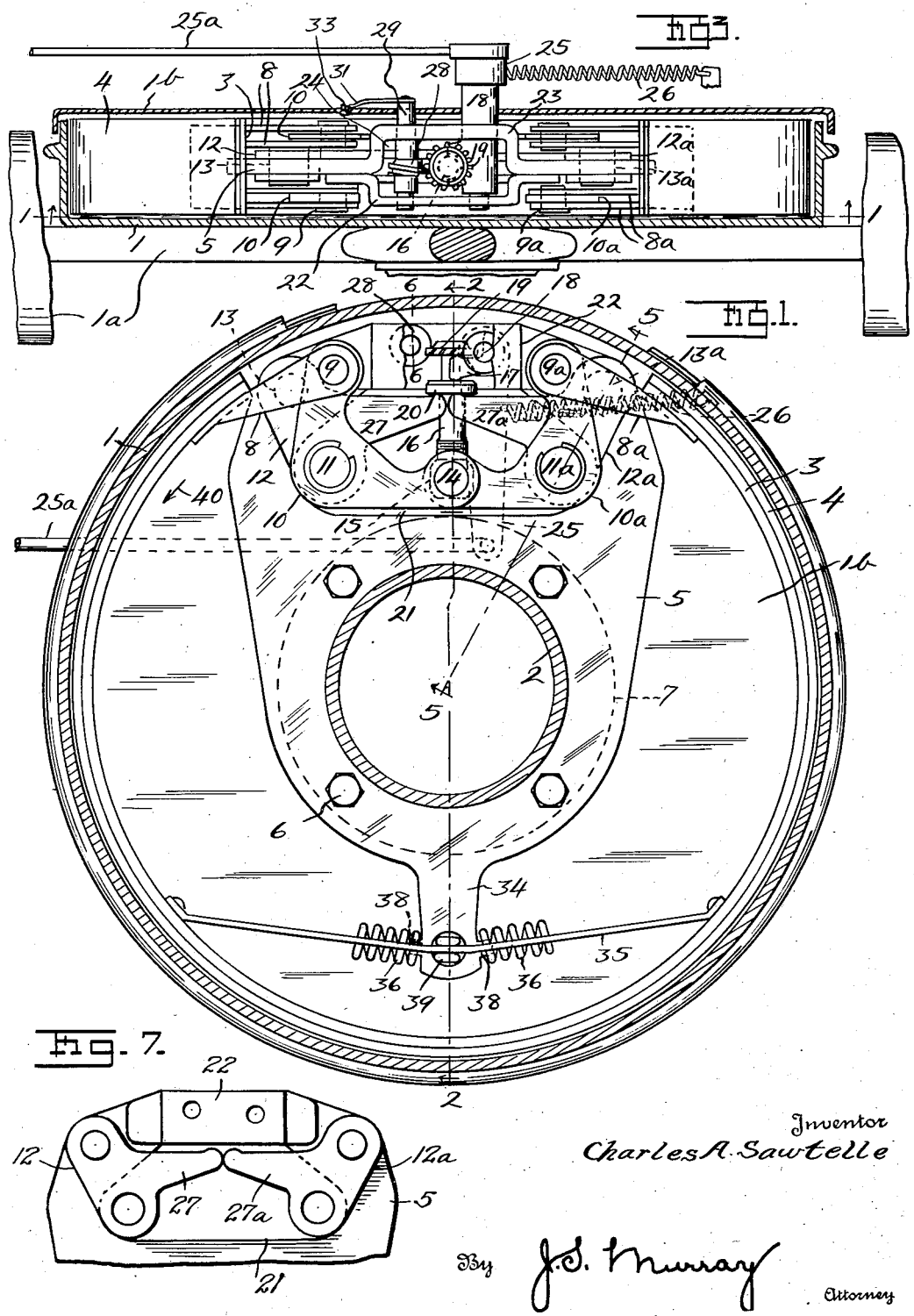

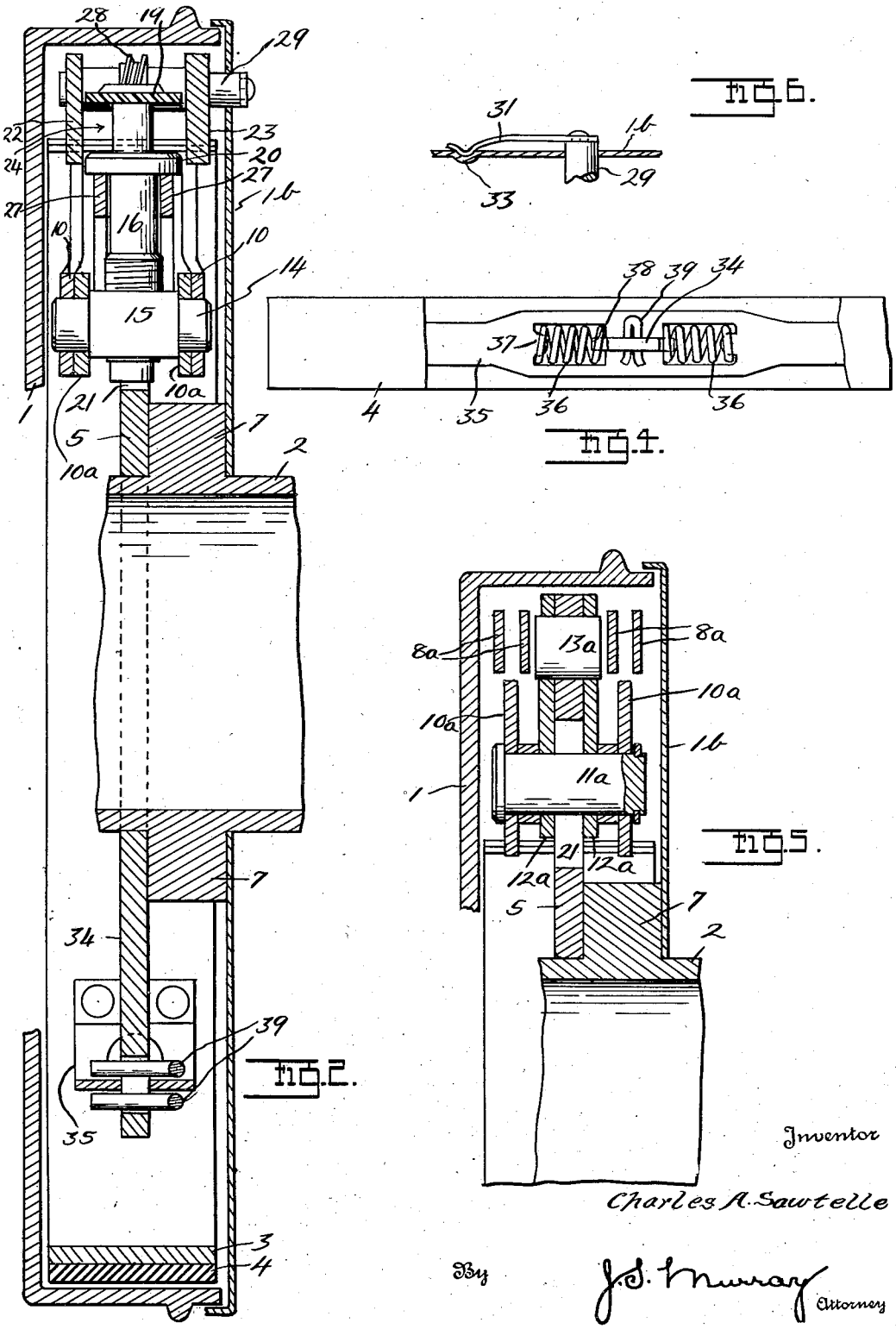

2,051,275

UNITED STATES PATENT OFFICE 2,051,275

BRAKE

Charles A. Sawtelle, Detroit, Mich., assignor to
S. & D. Engineering Company, Detroit, Mich.,
a corporation of Michigan Application October 16, 1933, Serial No. 693,731

17 Claims. (Cl. 188—78)

This invention relates to brakes, and particularly vehicle brakes.

An object of the invention is to provide for applying a brake, through the usual range of selective pressures, with considerably less muscular effort than is now generally required, by utilizing a predetermined fraction of the torque induced in the brake band or shoe by the originally applied force to automatically build up said force.

Another object is to utilize, as above described, a fraction of the torque initially imposed upon a band or shoe, to automatically build up the initially applied pressure, and to eliminate any uncontrolled augmentation of brake pressure due to the grabbing or wrapping action of the band or shoe.

Still another object is to provide improved means, accessible from the exterior of a brake drum, for adjusting a brake band (or other friction element) within the drum to compensate for wear.

A further object is to oppose a yieldable resistance of predetermined magnitude to the torque thrust of a brake band or the like, and to utilize the resulting reaction upon the trailing portion of the band to compensate for the inherent tendency of the leading portion of the band to exercise a pressure superior to that of the trailing portion.

A still further object is to construct the actuating mechanism for a brake band or shoe largely of sheet metal stampings and thus promote low cost production and a compact assembly.

These and various other objects the invention attains by the construction hereinafter described, and illustrated in the accompanying drawings, wherein:

Fig. 1 is a view in sectional elevation of the improved brake, the plane of section being a rotational one, indicated by the line 1—1 of Fig. 3.

Fig. 2 is a vertical cross sectional view of the brake, taken upon the line 2—2 of Fig. 1.

Fig. 3 is a top plan view of the brake, with the drum broken away to disclose interior mechanism.

Fig. 4 is a bottom plan view of the brake band, same being partly broken away to disclose interior mechanism.

Fig. 5 is a radial sectional view of the brake, taken on the line 5—5 of Fig. 1, and disclosing certain features of the control mechanism.

Fig. 6 is a fragmentary vertical section taken upon the line 6—6 of Fig. 1, and showing a provision for maintaining a desired adjustment for wear.

Fig. 7 is a fragmentary elevational view, showing particularly a pair of links formed integrally with arms projecting toward each other, this view omitting other parts which, in Fig. 1, largely conceal said links and arms.

In these views, the reference character 1 designates a brake drum attached at one side to a wheel 1a, and closed at its other side by a dust plate 1b, suitably restrained from rotation, as by attachment to an axle housing 2. A suitable friction means such as a brake band 3 of the usual flexible type is interiorly engageable with said drum, and is equipped with the usual renewable lining strip 4. The ends of said band are spaced apart adequately to provide for location of a suitable actuating mechanism between said ends.

Within said drum, and substantially in its central plane of rotation, is mounted a heavy sheet-metal plate 5 to carry said actuating mechanism. Said plate, in the illustrated embodiment of the invention, is secured to the axle housing 2, preferably by bolts 6 engaging a flange 7 exteriorly formed on said housing.

The upper end portion of the plate 5 lies between and adjacent to the ends of the band and is overlapped by brackets 8 and 8a, projecting toward each other from the band extremities. Each of the latter rigidly carries two pairs of said brackets, said pairs extending at opposite sides of the plate 5, and being preferably each formed as a sheet-metal stamping.

Engaged between each pair of the brackets 8 and pivoted thereto by a pin 9, is the upwardly projecting arm of a stamped sheet-metal bell crank 10, the other arm of which projects toward the vertical axial plane of the drum. The two bell cranks 10 thus connected to the normally trailing band extremity are pivoted at their apices upon a pin 11, which is in turn journaled in the lower ends of a pair of stamped sheet-metal links 12, occupying a substantially radial relation to the drum. The latter lie against opposite faces of the plate 5 and are jointly pivoted, at their upper ends upon said plate by a pin 13. Similar bell cranks 10a, disposed reversely to the bell cranks 10 comprise upwardly projecting arms connected at 9a to the normally leading end of the band and horizontally projecting arms terminally overlapping the corresponding arms of the bell cranks 10. The bell cranks 10a are pivoted at their apices, correspondingly to the bell cranks 10 on pins 11a journaled in the lower ends of radial sheet-metal links 12a, which are pivoted at their upper ends on the plate 5 by a pin 13a. The pins 13 and 13a may be held in place by their confinement between the adjacent pairs of brackets 8 and 8a, as best appears in Fig. 5.

From the foregoing, it will appear that there are two reversely disposed pairs of the bell cranks 10 and 10a, the respective pairs being connected to the respective ends of the brake band and the members of each pair lying at opposite sides of the plate 5. The horizontal arms of all four bell cranks are pivotally interconnected by trunnions 14 projecting integrally from opposite faces of a rectangular nut 15, each trunnion being engaged by overlapping arms of two bell cranks 10 and 10a.

For actuating the bell cranks in unison, a vertical stem 16 is threaded at its lower end into the nut 15 and a yoke 17 formed upon a rock-shaft 18 is engaged between a pair of annular flanges 19 and 20 carried by the upper portion of said stem. To accommodate said stem and the nut 15, an opening 21 is formed in the upper portion of the plate 5, and preferably has a lateral extent adequate to accommodate the pins 11 and 11a, thus affording the latter a limited movement in the rotational plane of the drum.

Above the opening 21, there is welded or otherwise rigidly secured to the plate 5 a relatively small plate 22, elongated circumferentially of the drum. The mid portion of said small plate and an opposed portion 23 of the plate 5 are reversely laterally offset to form an approximately rectangular chamber 24, receiving the flanked upper end of the stem 16. Also the spaced walls of said chamber journal the rock-shaft 18 and maintain engagement of the yoke 17 between the flanges 19 and 20 within said chamber. Said rock-shaft extends exteriorly of the drum through the dust plate 1b, and carries any suitable actuating element, exemplified by the arm 25. Said arm may be connected by a pull rod 25a and other suitable mechanism to a control pedal (not shown). Preferably a coiled spring 26 extends from said arm to the outer margin of the dust plate (or some other fixed support), establishing the illustrated normal positions of the shaft 18, stem 16, and yoke 17, and bell cranks 10 and 10a, effecting retraction of the brake band. Clockwise actuation of the rock-shaft (see Fig. 1) overcomes the spring 26, raises said stem, and acts through the bell cranks to expand the band against the drum.

The links 12 and 12a are respectively integrally formed with arms 27 and 27a, terminally projecting beneath the flange 19 for the purpose of utilizing a fraction of the torque pedally impressed on the brake band, to automatically increase the pressure applied by the band. This feature will presently be explained in detail.

To effect wear-compensating adjustment of the described mechanism, a worm 28, fast on an adjusting shaft 29 in the chamber 24, is meshed with gear teeth peripherally formed on the flange 19. Said shaft, journaled in the walls 22 and 23 of said chamber, has an end portion projecting exteriorly of the drum through the dust plate 1b. Said end portion is squared to non-rotatively and rigidly mount a sheet metal spring 31 terminally urged against the dust plate and terminally bent to an approximate V form for engagement in an indentation 33 in the dust plate, to restrain the adjusting shaft from rotation. A stressing of said spring away from the dust plate allows rotative actuation of the adjusting shaft and stem 16, such as to screw the latter increasingly into the nut 15. Since under these conditions the stem is restrained by the yoke 17 from vertical actuation, the described rotation of the stem elevates the nut 15, thereby rocking the two bell-cranks in a direction to increasingly space the brake band extremities.

From the lower end of the plate 5, a tongue 34 projects downwardly to engage freely in a slot formed centrally in a leaf spring 35, bridged across the lower portion of the brake band, and terminally riveted to the latter. Said spring has a shallow V-form, its halves upwardly diverging to encounter the band in a predetermined angular relation, adapting said spring to properly guide the band in its expansion and contraction. Said spring furthermore materially assists in holding the band centered in the drum, with respect both to the side walls and periphery of said drum.

Said central slot in the leaf spring 35 has extensions at each side of the tongue 34, accommodating a pair of coiled springs 36, held in place at their outer ends by lugs 37 integral with said leaf spring and at their inner ends by a pair of lugs 38, integral with the tongue 34. A pair of cotter pins 39 or the like are passed through the tongue 34, above and below the spring 35, restraining the mid portion of said spring from vertical movement while allowing it an approximately circumferential travel.

In applying the described brake, the rock-shaft 18 is actuated (through the usual foot pedal, pull rods and levers, not shown) in a direction to elevate the yoke 17, acting through the latter to lift the stem 16. Resultant reverse rocking of the paired bell cranks 10 and 10a spreads apart the brake band extremities, and expands the band against the drum. The latter, if rotating in a normal direction, imposes a torque on the band, acting as indicated by the arrow 40 in Fig. 1. This torque is resisted by the pins 9a at the leading end (or heel) of the band and tends through said pin to rock the bell-cranks 10a in a counter-clockwise direction (see Fig. 1). Such tendency is, however, negatived by the pedal-imposed force, holding the stem 16 raised. Consequently, the bell-cranks 10a act as substantially rigid members in receiving said torque thrust, and transmit such thrust to the trunnions 14 and thence to the bell-cranks 10 and lower end of the stem 16, so as to effect a limited swinging of the links 12 and 12a and stem 16 in the approximate direction of drum rotation. The arms 27a are thus swung upwardly at their free ends and deliver their upthrust to the stem 16 through the flange 20. Thus, the pedal-induced braking effort is automatically augmented by a torque factor, applied through the arms 27a, and constituting a fraction of the brake-band torque established by the ratio between the effective length of the links 12a, and that of the arms 27a, as measured from the pin 13a. By selecting a desired ratio for this controlling fraction, the brake-band torque may be utilized to a predetermined extent in automatically increasing any muscularly applied braking effort.

An important advantage accruing from the use of the described mechanism, as a means for expanding the brake band, lies in the reaction of the paired bell-cranks upon each other to prevent the band from exerting an uncontrollable wrapping pressure upon the drum. Thus, if the drum is rotating in its usual direction, as indicated by the arrow, when the brake is applied, there is a tendency originating at the trailing or toe end of the band to expand the latter increasingly due to torque imposed on said end. The torque thrust imposed on the pin 9a by the wrapping effect acts, however, through both bellcranks to exert an equivalent upwrapping effect on the trailing or toe end of the band, whereby wrapping or grabbing is effectively controlled.

It will be noted that the horizontal arm of the bell-crank 10a is slightly longer than that of the bell crank 10, thus affording the former a slight mechanical advantage in acting on the latter, to more completely and readily overcome wrapping effects.

It is also to be noted that the arms 27 jointly form a stop, positively limiting down travel of the stem 16 and thus limiting retraction of the band. The links carrying said arms cannot swing apart responsive to engagement of said arms by the flange 20, since said links are tied together by the lower arms of the paired bell-cranks.

The purpose of the springs 36 is to counteract the tendency of the leading portion of the brake band, for either direction of rotation of the drum, to engage the latter under greater pressure than the trailing portion. This tendency is objectionable in that it results in a wearing out of the normally leading portion of the brake lining in advance of the trailing portion thereof. The illustrated construction causes the arm 35 to act compressively upon one or other of the springs 36 when the drum is imposing torque upon the band, with the result that the spring so compressed increases the braking pressure applied to the trailing portion so as to overcome or at least reduce, the discrepancy which would otherwise arise between pressures acting in the leading and trailing portions of the band.

It is important to note that the torque-induced increase in the initially applied braking force is not merely the reaction of a master shoe or band on a servo shoe or band, but involves utilization of a torque arising from an initial application of a friction applying member to subject the same member to a considerably increased braking force.

Furthermore, utilization of torque in the disclosed brake for augmenting the initially applied force does not entail any greater circumferential travel of the friction-applying member than is required to render said member properly responsive to the initially applied control.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. A brake comprising a brake drum, a dust plate forming a closure for one side of the drum, friction means interiorly engageable with said drum, a control member within the drum movable to actuate said friction means, an adjusting shaft extending exteriorly of the drum through said dust plate, an actuating connection from said shaft to said control member, a handle carried by said shaft exteriorly adjacent to the dust plate and adapted to interlock with the dust plate, and a spring normally urging said handle into interlocking engagement with the dust plate.

2. A brake comprising a brake drum, friction means interiorly engageable with said drum, a control member for said friction means, a link mounted substantially radially within the drum and adapted to swing about its outer extremity, a member pivoted upon the inner extremity of said link and establishing an actuating connection from said control member to said friction means, and an arm carried by said link, reacting upon said control member responsive to torque in the friction means, to automatically increase the applied braking effort.

3. A brake comprising a brake drum, friction means interiorly engageable with said drum, a radially movable control member for said friction means, a pivotal actuating connection between said control member and the friction means, a link pivotally mounting said actuating connection and angularly actuable responsive to the torque of the friction means, and an element carried by said link, reacting upon said control member responsive to torque in said friction means to automatically increase the applied braking effort.

4. A brake comprising a brake drum, friction means interiorly engageable with said drum and having spaced ends, a control member positioned between said ends and movable substantially radially, a pair of actuating connections to said spaced ends from said control member, a pair of substantially radial links each pivotally mounting one of said actuating connections, and a pair of elements respectively carried by said links reacting upon said control member responsive to torque in said friction means, to automatically increase the applied braking effort.

5. A brake comprising a brake drum, a brake band interiorly engageable with said drum, a leaf spring bridging the mid portion of the band, a fixed support for the mid portion of said leaf spring, affording said spring a sliding travel approximately circumferential to the drum, and means reacting between said support and the leaf spring at each side of the support, resisting the torque thrust of the band.

6. A brake comprising a brake drum, friction means interiorly engageable with the drum and comprising spaced ends, a pair of pivotally interconnected actuating members connected to said ends, an actuating stem for such members engaging them at their interconnection, and circumferentially spaced elements for actuating the stem longitudinally thereof to apply the brake, and for actuating the stem longitudinally thereof in compensation for wear of the friction means, the stem being engaged between said elements.

7. A brake comprising a brake drum, a brake band interiorly engageable with said drum, a leaf spring carried by and bridging the mid portion of the band and bent to diverge toward its ends from said mid portion, and a support fixed relative to the drum, and mounting the mid portion of the leaf spring for a sliding travel tangential to said support.

8. A brake comprising a brake drum, means within the drum expansible to frictionally engage the drum, a pair of copivotal levers, an actuating element operatively engaging both of said levers, an actuating connection from the levers to said means, and a support for said levers, disposed between the levers and formed with an opening receiving the actuating element, and fixed as regards drum rotation.

9. A brake as set forth in claim 8, said actuating element being mounted on said support.

10. A brake comprising a brake drum, means within the drum expansible to frictionally engage the drum, said means having ends spaced circumferentially of the drum, a sheet metal plate mounted within and fixed relatively to the drum, approximately in its mid plane of rotation, an actuating element movable in said plane, and two pairs of levers operatively connecting said element to said ends, the levers of each pair being co-pivotal on the support, at opposite sides thereof.

11. A brake comprising a brake drum, means within the drum expansible to frictionally engage the drum, said means having ends spaced circumferentially of the drum, a sheet metal plate mounted within and fixed relatively to the drum, approximately in its mid plane of rotation, mechanism for expanding said means mounted upon the plate at one side of the drum axis and operatively connected to said ends, and means carried by the plate at the opposite side of the drum axis and engaging said means remotely from its ends for guiding said means into and out of engagement with the drum.

12. In a brake, the combination with a brake drum and means within the drum expansible to frictionally engage the drum, said means having ends spaced circumferentially of the drum, of a mechanism engaging such ends to expand the frictional means including a nut, a substantially radial stem threaded into the nut, means for shifting the stem radially to apply the brake, and means for rotating the stem to compensate for wear of the friction means.

13. A brake comprising a brake drum, means within the drum expansible to frictionally engage the drum, said means having ends spaced circumferentially of the drum, a pair of bell cranks, actuating connections from the bell cranks to said spaced ends, a nut pivotally interconnecting the bell cranks, a stem having a threaded portion engaging the nut, means for bodily moving the stem to rock the bell cranks and expand the friction means, and means for rotating the stem in the nut to vary the effective length of the stem.

14. In a brake, the combination with a brake drum, and means within the drum expansible to frictionally engage the drum, said means having ends spaced circumferentially of the drum, of a mechanism engaging said spaced ends for expanding the friction means including a nut, a stem threaded into the nut and formed with a toothed annular flange, a lever engaging said flange to actuate the stem radially, and a gear engaging said flange for rotating the stem to vary its effective length.

15. A brake comprising, in combination, a brake drum, an expansible and contractible band having a limited circumferential movement with respect to the drum, a pair of bell cranks pivotally connected to the band and to each other for operating the band, means for rocking the bell cranks, operating on their pivotal interconnection, a pair of links respectively pivotally mounting the respective bell cranks, and occupying an approximately radial relation to the drum, pivotal supports for the links, occupying a fixed spaced relation, and means carried by said links reacting upon said rocking means responsive to torque of said band to automatically augment the applied braking effort.

16. A brake comprising, in combination, a brake drum, an expansible and contractible band having a limited circumferential movement with respect to the drum, a pair of bell cranks pivotally connected to the band and to each other for operating the band, means for rocking the bell cranks, operating on their pivotal interconnection, individual pivotal supports for the bell cranks, independently affording them a limited travel approximately circumferential to the drum, and means carried by said pivotal supports reacting upon said rocking means responsive to torque in said band to automatically augment the applied braking effort.

17. In a brake the combination with a brake drum and means within the drum expansible to frictionally engage the drum, said means having ends spaced circumferentially of the drum, of a pair of bell cranks, actuating connections from the bell cranks to said spaced ends, a lever, an actuating connection from said lever to the bell cranks comprising a stem and a nut threaded on the stem, said stem and nut being relatively rotatable to vary the effective length of the actuating connection, and means operable from the drum exterior for relatively rotating the stem and nut.

CHARLES A. SAWTELLE.